United States Patent
Ganowski

[11] 3,932,725
[45] Jan. 13, 1976

[54] METHOD FOR MONITORING AND REGULATING ELECTRICAL RESISTANCE WELDING

[75] Inventor: Franz-Josef Ganowski, Maingrundel, Germany

[73] Assignee: Keller & Knappich Augsburg Zweigniederlassung der Industrie-Werke Karlsruhe Augsburg Aktiengesellschaft, Augsburg, Germany

[22] Filed: Feb. 28, 1974

[21] Appl. No.: 446,849

[30] Foreign Application Priority Data
Mar. 27, 1973 Germany.......................... 2315184

[52] U.S. Cl................................. 219/110; 219/117
[51] Int. Cl.².......................................... B23K 11/24
[58] Field of Search..................... 219/109, 110, 117

[56] References Cited
UNITED STATES PATENTS

| | | | |
|---|---|---|---|
| 3,389,239 | 6/1968 | Treppa et al. | 219/109 X |
| 3,445,768 | 5/1969 | Ferguson | 219/109 X |
| 3,582,967 | 6/1971 | Beckman et al. | 219/110 X |

OTHER PUBLICATIONS
"Nondestructive Bond Quality Monitor for Resistance Bonds," *IBM Technical Disclosure Bulletin*, Vol. 14, No. 2, 7/1971, p. 481.

*Primary Examiner*—J. V. Truhe
*Assistant Examiner*—Clifford C. Shaw
*Attorney, Agent, or Firm*—Allison C. Collard

[57] ABSTRACT

A method for monitoring and regulating electrical resistance welding by comparing the actual values obtained by integrating measured values of the welding electrodes with desired valued limits obtained by test welding operations in the form of voltage and current parameters. These parameters are integrated in accordance with the formula $$\int_o^t I \cdot R^y \cdot dt.$$

wherein $y$ is other than unity and is selected so that the influence of the resistance $R$ on the actual, measured value is at least equivalent to the influence of the current $I$ and/or the welding time $t$, in the above formula, on the measured value. The resultant weld value is then fed to a comparison circuit which contains the upper and lower limits obtained by the test welding. If these limits are exceeded the power to the welding apparatus is automatically disconnected.

1 Claim, 1 Drawing Figure

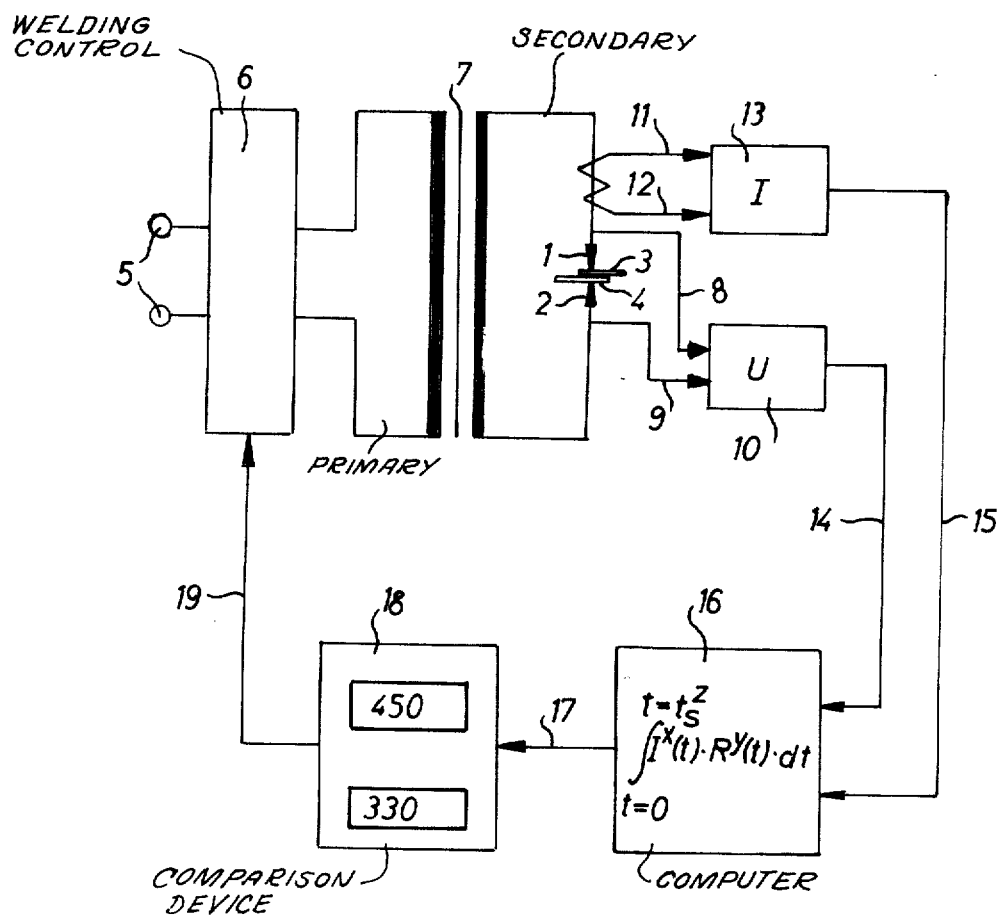

METHOD FOR MONITORING AND REGULATING ELECTRICAL RESISTANCE WELDING

This invention relates to a method for monitoring and/or regulating electrical welding processes such as, for example, spot, seam, projection, and butt welding in order to ensure the quality of the weld.

Quality criteria in, for example, spot welding are spot diameter, penetration depth of the nuggets, indentation depth of the electrodes, shear tension, torque, alternating bending force and direct tension. In known process control devices, upper and lower quality threshold values are chosen which represent production limits corresponding to the conditions occurring in practice. On passing above or below these limits, a warning signal can be given, so that the welding process can be switched off, or there can be an automatic adjustment.

The weld result depends on various parameters, such as, the shape of the metal sheets to be welded, the edge distance, the sheet metal quality and surface characteristics, characteristics and shape of the electrodes, electrode force, welding current, current time, interval time, post-weld time, water cooling, tooling and setup and skill of the welder. In addition, during the welding process the individual parameters can be displaced, e.g., the production and dissipation of heat. Therefore, the weld result is dependent on the sum of a plurality of inseparable processes and factors.

There are many measurable parameters such as the welding current, voltage, etc. which can be used for monitoring devices for the welding process. Consequently, it is known, for example, that process control devices working from the welding time form the integral of I.R.dt or the pure product from instantaneous values I.R.t, wherein I is the secondary welding current (ampere), R the resistance between the electrodes (ohm), and t the welding time (sec.). The measured value thus obtained is compared with a set upper and lower quality threshold value.

According to the findings serving as a basis for the invention, this method of forming the measured value does not provide a realistic picture of the sum of the plurality of previously indicated factors which are decisive for good weld results. In particular, in the resistance R, important factors are reflected whose significance is also not taken adequately into account in the known measured value since parameters I and t have a large indication range, while parameter R has comparatively a much smaller indication range within the scope of the measured value formed e.g. for I between 330 and 450 millivolt seconds (mVs) and for R between 370 and 410 mVs.

The present invention provides an improved method for monitoring and/or regulating electrical resistance welding processes by comparing the desired and actual values in such a way that the weld quality appropriate for the particular purpose is ensured.

According to the invention, the weld result used is the instantaneous product of $I.R^Y.t$ or as an integral $I.R^Y.dt$, determined via the welding time t (sec.), whereby Y is other than unity. The magnitude of Y is appropriately selected in such a way that the influence of the resistance R on the actual, measured value is at least equivalent to the influence of the current I and/or the welding time $t$ on the measured value.

Obviously, nothing in the inventive teaching is changed if in mathematical conversions in the most general form $I^X.R^Y.t^Z$, the same basic principle is maintained.

As an embodiment of the invention the spot welding of two metal sheets of uncoated steel approximately 2 mm thick is explained. For this example, the usual value for the secondary welding current $I = 13,000A$. The resistance R between the electrodes is about 100 microohm and a welding time $t = 0.3$ sec. is chosen. By varying the welding current, the lower current limit, corresponding to possible bonding of the sheets, was determined as 11,000A, and the upper current limit was 15,000A, corresponding to burning. Consequently, from the product I.R.t at the same resistance R and the same welding time $t$, 330 and 450 mVs are obtained as the magnitudes for the lower and upper threshold values respectively.

As a result, for example, of varying the electrode force for the same current I of 13,000A, the lower and upper limits, corresponding to bonding and burning, are determined at 95 or 105 microohms respectively. In this case, magnitudes of 370 and 410 mVs are obtained for the lower and upper threshold values. Thus, the fluctuation range between 11,000 and 15,000A, corresponding to an value between 330 and 450 mVs is possible by limiting the current I to the range between 370 and 410 mVs by the fluctuation range of resistance R.

If, according to the invention, the measured numerical value for resistance R is raised by a power of three, then, assuming a constant welding current of 13,000A for the previously determined fluctuation range for resistance R between 95 and 105 microohms, an value between 330 and $450.10^{-8}$ volt$^3$/amp$^2$. sec is obtained. Therefore the values for the previously determined variation in the welding current between 11,000 and 15,000A at a constant resistance of 100 microohms move exactly in the above-given range of 330 to 450.

Consequently, by raising the numerical value for resistance R by a power of 3 the indicated range for resistance R is equated with the range for current I, i.e., the particular values for the lower and upper limit values coincide determined by varying the welding current I and/or varying the resistance R on the basis of the respective bonding or burning of the sheets.

The aforementioned embodiment will now be explained in more detail with reference to the attached drawing of which the sole FIGURE constitutes a schematic diagram that illustrates the inventive method. The diagram shows that when the nominal value limits are exceeded or not reached by the actual value, the welding process is switched off automatically.

In the drawing, welding electrodes 1 and 2 are schematically shown and are used to weld sheet metal parts 3 and 4 by spot welding. The energy supply for electrodes 1 and 2 is provided by a circuit 5 via a welding control unit 6 and a weld transformer 7.

A voltage U is sensed across the weld point at electrodes 1 and 2 by means of conductors 8, 9, detected in a measuring device 10 and suitably converted in a computer unit 16 via a line 14 for further use. Correspondingly a welding current I is sampled by means of feed lines 11 and 12, which are connected to a measuring unit 13 and then converted.

The voltage and current values are fed from units 10 and 13 to the computer unit 16 through the lines 14 and 15, respectively. The computer calculates the resistance R at the welding point in accordance with the formula $$R = \frac{U}{I}$$

and thus calculates the actual value at each point in accordance with the formula $$\int_{t=0}^{t=t_x} I^z(t) \cdot R^y(t) dt$$

In the formula, $I$ is the welding current, $R$ is the resistance of the weld point and $t_x$ the welding time. The exponents $x$ and $z$ have the value 1, in accordance with the described embodiment, while exponent $y$ has the value 3.

The actual value obtained is fed through a line 17 a comparison unit 18, wherein the actual value is compared with preset nominal values which were obtained by test welding. In the subject embodiment, these nominal value limits are 330 and 450 mVs, respectively. As long as the actual value for a defined spot weld lies within the nominal value limits, comparison device 18 does not signal. However, if the actual value either exceeds or falls below the established nominal value limits, comparison device 18 sends an electrical control pulse which is led to welding control unit 6 through a line 19, so that the welding process is switched off.

While only a few aspects of the inventive method have been shown and described, it will be obvious that many changes and modifications may be made thereunto without departing from the spirit and scope of the invention.

What is claimed is:

1. A method for selectively monitoring and regulating electrical resistance welding processes by comparing actual, measured values with desired value limits, the latter being a measure of acceptable welding quality, comprising the steps of: conducting at least one test welding operation to establish the desired value limits, while the actual values are obtained during an actual welding operation; the desired value limits relating to the secondary welding current I, the resistance R between the welding electrodes, as well as the welding time t measured during a single actual welding operation; measuring the voltage across the electrodes, and the current applied thereto, during the actual welding operation; integrating the actual values of the voltage and the current to produce a welding result, by interpolation of both the actual and the desired values in the formula:

$$\int_o^t I \cdot R^y \cdot dt,$$

wherein $I$ is the secondary welding current in amperes,
$R$ is the resistance between the electrodes in ohms,
$Y$ is an exponent other than unity, and
$t$ is the welding time in seconds;

the current, the resistance and the time being subject to unavoidable and tolerable fluctuations in predetermined ranges during the actual welding operation; selecting the magnitude of the exponent so that the influence of the resistance on the desired value limits is at least equivalent to the influence of at least one of the current and the welding time on the same value limits when the former fluctuate within the predetermined ranges; comparing the actual values with the desired value limits; and at least partly disconnecting electrode power when the actual values meet or exceed the desired value limits.

* * * * *

UNITED STATES PATENT OFFICE
CERTIFICATE OF CORRECTION

Patent No. 3,932,725  Dated January 13, 1976

Inventor(s) Franz-Josef Ganowski

It is certified that error appears in the above-identified patent and that said Letters Patent are hereby corrected as shown below:

Column 2, line 1, change "$I^X \cdot R^Y \cdot t^2$" to --$I^X \cdot R^Y \cdot t^Z$--

Column 3, line 10, the formula should correctly read:

$$\int_{t+0}^{t=t_s^z} I^X(t) \cdot R^Y(t) \cdot dt$$

Signed and Sealed this

Seventh Day of June 1977

[SEAL]

Attest:

RUTH C. MASON  
*Attesting Officer*

C. MARSHALL DANN  
*Commissioner of Patents and Trademarks*